(No Model.)

W. N. CARLISLE.
HARNESS.

No. 550,936. Patented Dec. 3, 1895.

WITNESSES
D. H. Bradford
Grace Williams

INVENTOR
William N. Carlisle
By Parker & Burton
Attorneys.

UNITED STATES PATENT OFFICE.

WILLIAM N. CARLISLE, OF DETROIT, MICHIGAN.

HARNESS.

SPECIFICATION forming part of Letters Patent No. 550,936, dated December 3, 1895.

Application filed April 25, 1895. Serial No. 547,101. (No model.)

*To all whom it may concern:*

Be it known that I, WILLIAM N. CARLISLE, a citizen of the United States, residing at Detroit, county of Wayne, and State of Michigan, have invented a certain new and useful Improvement in Harness; and I declare the following to be a full, clear, and exact description of the invention, such as will enable others skilled in the art to which it pertains to make and use the same, reference being had to the accompanying drawings, which form a part of this specification.

This invention relates to harness, and has for its object an improvement in that class of harness especially adapted for speed purposes, where all the muscular movement of the horse should be unimpeded as much as possible. The driver sits on a sulky and is drawn by the horse, and consequently the sulky must in some way be harnessed to the horse.

Figure 1:
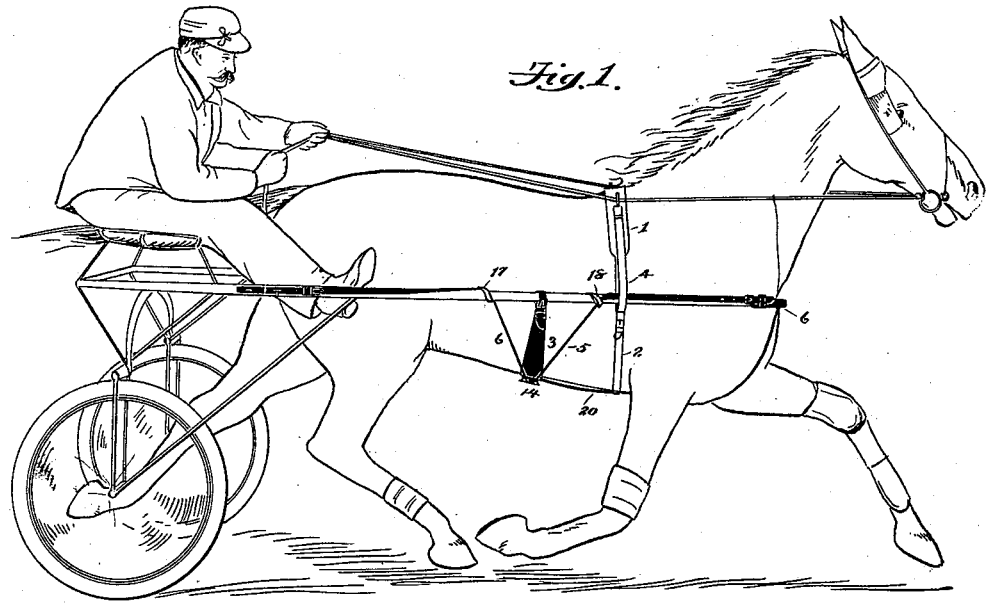
Figure 2:
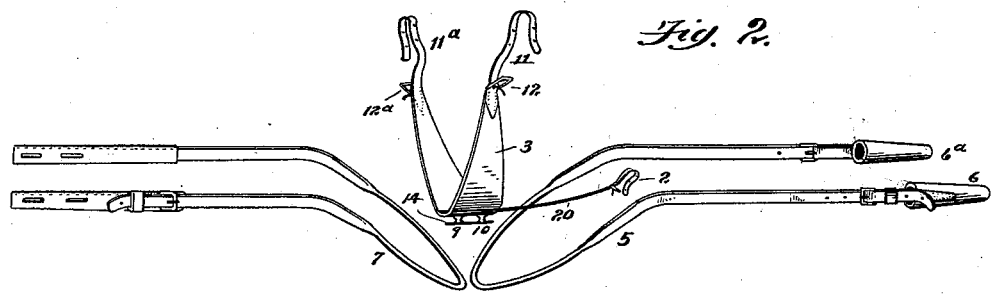
Figure 3:
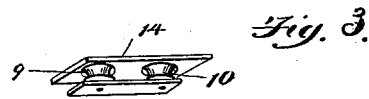

In the drawings, Figure 1 shows the horse with the harness in place. Fig. 2 shows the several parts of the harness. Fig. 3 shows the pulley-plate on the girth.

I employ the usual saddle and belly-band 1 2, and on this are the ordinary thill-tugs, one of which, 4, is seen on Fig. 1. The remainder and novel part of my harness consists in the front draft-strap 5, the rear draft-strap 7, and the girth 3. The girth 3 passes from one thill to the other and is tightly secured to both thills by billets 11 11$^a$ and buckles 12 12$^a$. The main part of the girth passes under the body of the horse, and midway between the thills is a housing 14, in which are two pulleys. The front draft-strap terminates at each end with a thimble or cap 6 6$^a$, each of which engages with the end of the thill to which it belongs. The middle part of the draft-strap is rounded and is turned around the pulley 10. Between the caps 6 6$^a$ and the strap are means for properly adjusting the length of the strap with reference to the thill and the size of the horse. The rear draft-strap is similar in construction, except that each end terminates with perforated or eyed pieces held by buckles to the main part.

To each thill are attached two loops 17 18, through which the draft-straps turn from the line along the thill toward the pulleys 9 10. The rear draft-strap bends around the pulley 9. From the middle of girth a strap 20 passes forward and is secured to the belly-band by a billet and buckle 21. The harness thus consists of three straps, which pass across from one thill to the other under the body of the horse. One of the straps fastens to the thills centrally, one passes forward and attaches to the front end of the thills, and one passes back and attaches to the thills where the thills meet the sulky-frame.

The weight of the driver tends to lift the forward ends of the thills and causes the girth 3 to bear strongly upward against the horse, and the girth is the only part of the harness touching the horse.

If the only attachment were through the saddle 1, thill-tugs 4, and belly-band 2, there would be a constant swinging of the thills, which would strike the horse and worry and impede him; but the remainder of the harness prevents this and relieves the horse from all trouble of this kind.

What I claim is—

In a speed harness, the combination of a girth strap adapted to cross from one thill to the other, a pair of pulleys attached to said strap, a front draft strap secured to the thills in front and crossing from one thill to the other, and a back draft strap secured to the thills at the rear end and crossing from one thill to the other, the front and back straps passing around said pulleys at the crossing of said girth strap, substantially as specified.

In testimony whereof I sign this specification in the presence of two witnesses.

WM. N. CARLISLE.

Witnesses:
C. F. BURTON,
F. CLOUGH.